Figure 1:
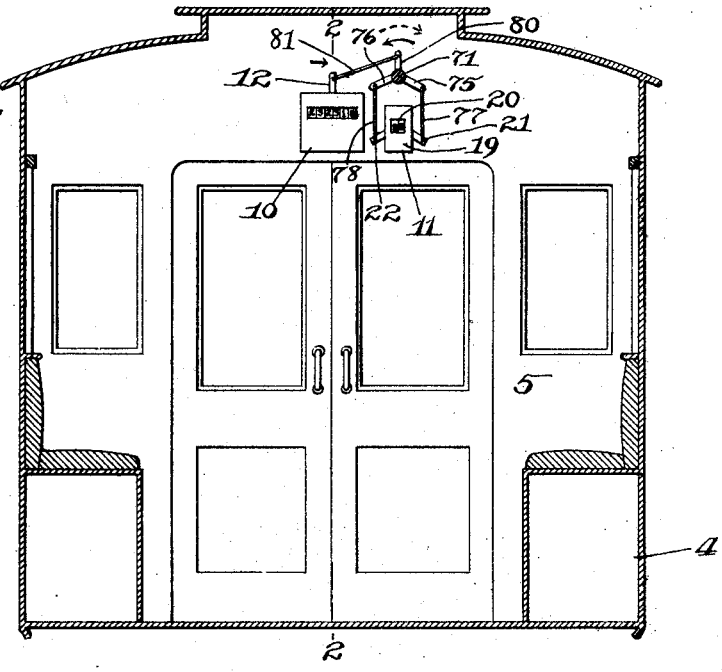

J. H. HOOD.
REGISTERING DEVICE FOR PASSENGER CARS.
APPLICATION FILED OCT. 22, 1908.

983,552.

Patented Feb. 7, 1911.
4 SHEETS—SHEET 1.

WITNESSES

INVENTOR
John H. Hood
BY
ATTORNEY

THE NORRIS PETERS CO., WASHINGTON, D. C.

J. H. HOOD.
REGISTERING DEVICE FOR PASSENGER CARS.
APPLICATION FILED OCT. 22, 1908.
983,552.
Patented Feb. 7, 1911.
4 SHEETS—SHEET 2.
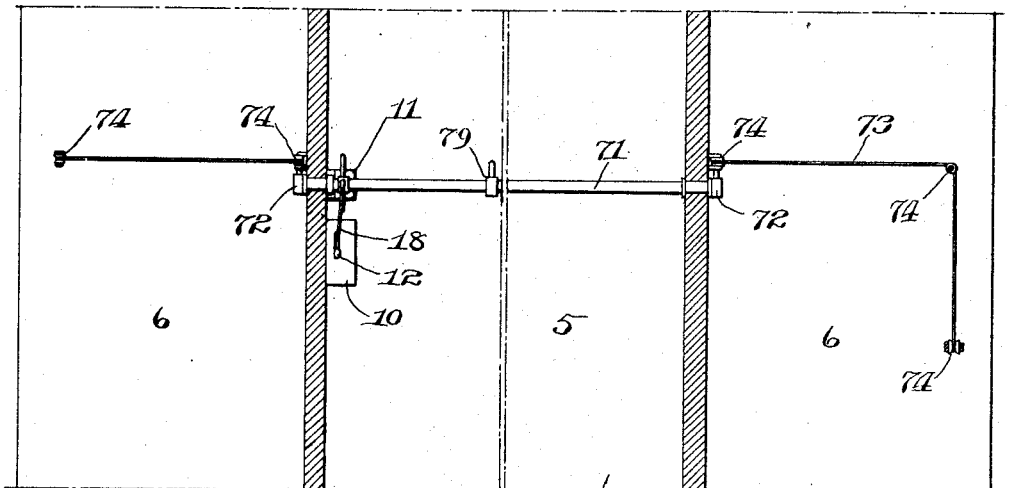
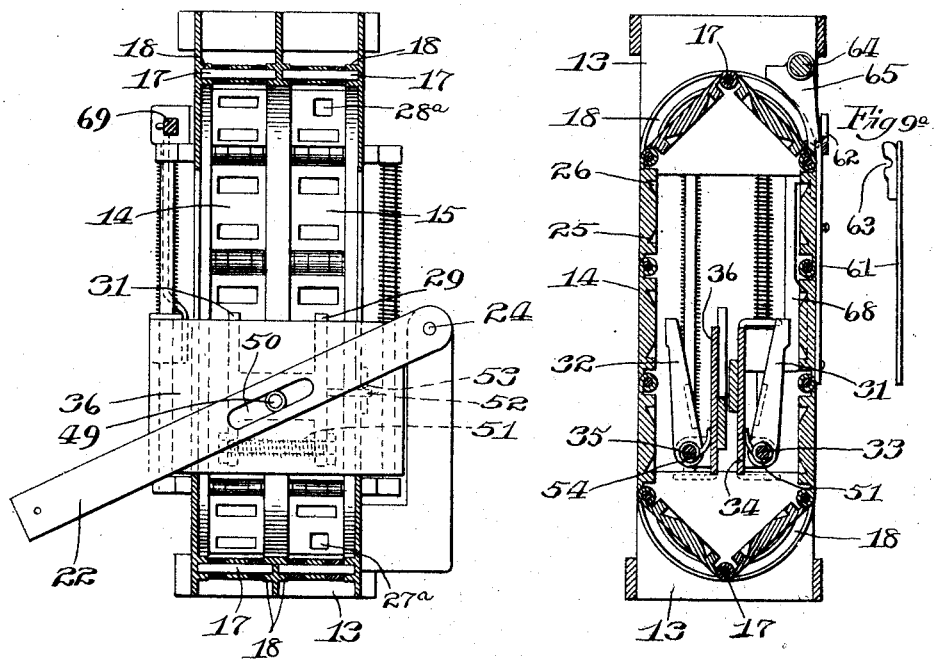
WITNESSES
INVENTOR
John H. Hood
BY
ATTORNEY J. H. HOOD.
REGISTERING DEVICE FOR PASSENGER CARS.
APPLICATION FILED OCT. 22, 1908.
983,552.
Patented Feb. 7, 1911.
4 SHEETS—SHEET 3.
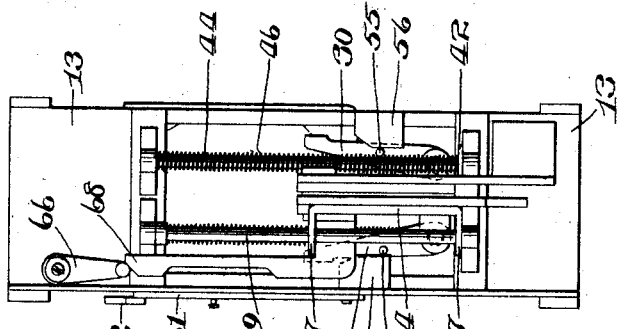
WITNESSES
INVENTOR
John H. Hood
BY
ATTORNEY J. H. HOOD.
REGISTERING DEVICE FOR PASSENGER CARS.
APPLICATION FILED OCT. 22, 1908.
983,552.
Patented Feb. 7, 1911.
4 SHEETS—SHEET 4.
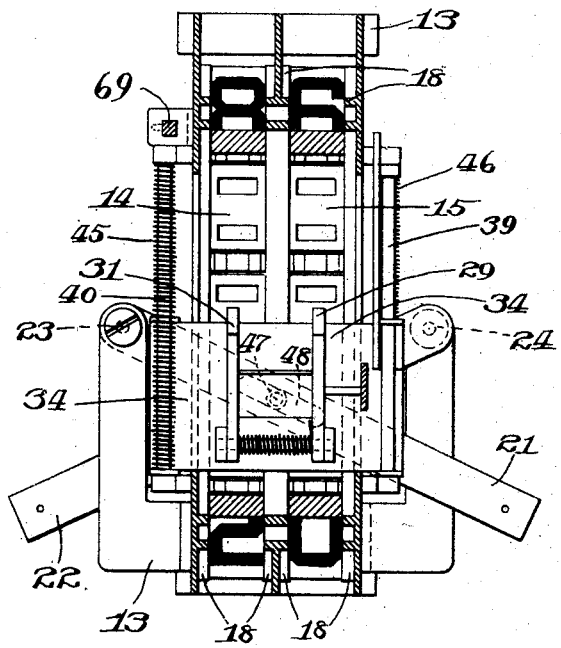
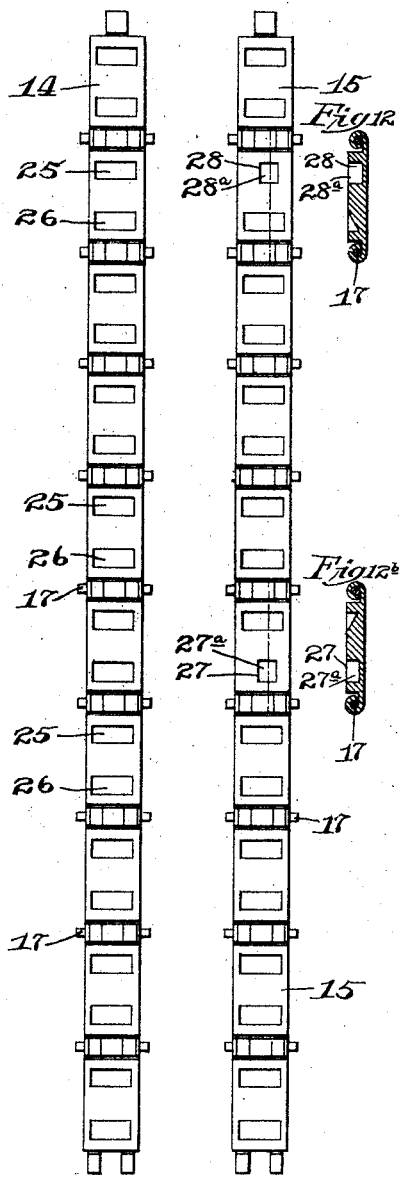
WITNESSES
INVENTOR
John H. Hood
BY
A. V. Grout
ATTORNEY
THE NORRIS PETERS CO., WASHINGTON, D. C.

UNITED STATES PATENT OFFICE.

JOHN H. HOOD, OF PHILADELPHIA, PENNSYLVANIA.

REGISTERING DEVICE FOR PASSENGER-CARS.

983,552.  Specification of Letters Patent.  Patented Feb. 7, 1911.

Application filed October 22, 1908. Serial No. 458,948.

*To all whom it may concern:*

Be it known that I, JOHN H. HOOD, citizen of the United States, and resident of the city and county of Philadelphia, State of Pennsylvania, have invented certain new and useful Improvements in Registering Devices for Passenger-Cars, of which the following is a full, clear, and exact description.

This invention relates to registering devices for passenger cars.

The object of my invention is to provide a simple and efficient means whereby the conductor of the car may readily ascertain whether or not he has collected a fare from each and every passenger aboard his car.

The invention includes a double acting registering device having a forward and backward registering movement, together with means whereby the forward registering movement of the device may be effected each time a passenger boards the car, and a separate means whereby the reverse registering movement of the device may be effected each time the conductor collects a fare from a passenger. Thus, if the registering device be operated to effect a forward registering movement (by, say, the motorman), each time a passenger boards the car, and if the registering device be operated to effect its reverse registering movement by the conductor each time a fare is collected, the device will, at all times, indicate the number of fares uncollected.

The invention further includes a connection of the registering device just mentioned with the ordinary well known registering device now in use which effects the registration of all the fares collected, the connection of the second named device with the first named device being such that the second device will register a fare each time a reverse movement of the first device has been operated to check off a collected fare. Thus the second device will be operated by the first device and will always indicate in the usual manner the entire number of fares collected.

The invention consists in the novel construction and combinations of parts which will be hereinafter fully described and particularly claimed.

Figure 2:
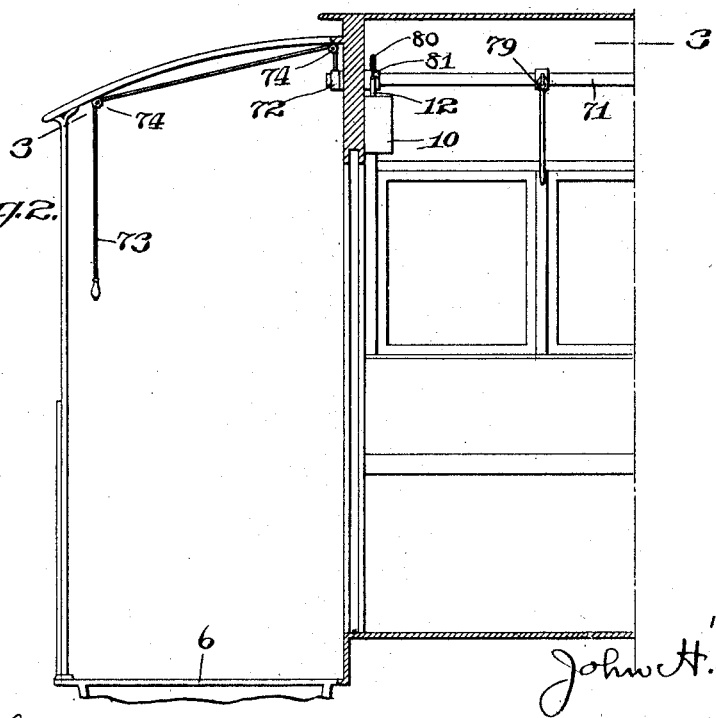

Figure 1 is a transverse vertical section through the body of an ordinary railway car provided with my invention. Fig. 2 is a vertical section as seen at right angles to Fig. 1, as on the line 2—2 of Fig. 1. Fig. 3 is a plan view in section as on the line 3—3 of Fig. 2, showing both ends of the car. Fig. 4 is an elevation of the double acting registering device with the casing therefor removed. Fig. 5 is an elevation of one side of the device shown in Fig. 4. Fig. 6 is an elevation of the other side of the device shown in Fig. 4. Fig. 7 is a section as on the line 7—7 of Fig. 4. Fig. 8 is a section as on the line 8—8 of Fig. 5. Fig. 9 is a section as on the line 9—9 of Fig. 4. Fig. 9ª is a detached view of the spring arm for locking the chains in position. Fig. 10 is a section as on the line 10ª—10ª of Fig. 5. Fig. 11 is a rear view of one of the chains in a straightened out condition. Fig. 12 is a similar view of the other chain. Figs. 12ª and 12ᵇ are details in section of two of the links of the chain shown in Fig. 12.

4 designates the body of a passenger car, the same being of ordinary construction commonly employed on railways. The car comprises the main body or interior portion 5 and the end platforms 6.

Arranged within the car body 5 are two registering devices 10 and 11. The registering device 10 is of common and well known construction, and is now commonly used upon passenger cars, and it includes an operating arm 12, which, when moved in the direction indicated by the arrow in Fig. 1, will register the collection of a fare from a passenger. The construction and operation of this device is common and well known, and therefore no detailed description or illustration thereof is deemed necessary herein. The registering device 11 is a double acting device for registering the passengers as they board the car, and for checking them off as the fares are collected from them. The registering device 11 comprises a frame 13 carrying two registering members 14 and 15 each of which has a forward and reverse movement. In the present instance these registering members 14 and 15 comprise plates 16 linked together to form endless chains, the pivot pins 17 of the links of which project laterally beyond the edges of the chains 14 and 15, and are fitted to endless trackways 18 which are formed in the frame 13. The trackways 18 are so constructed and located as to leave the front faces of the plates 16 exposed to view. The plates 16 of each chain 14 and 15 are ten in number, and the plates of each chain are provided with the following characters:— "1, 2, 3, 4, 5, 6, 7, 8, 9, and 0," one character being disposed upon each plate; and when the chains are at rest, the plates 16 thereof occupy side-by-side positions.

The front wall of the casing 19 for the registering device 11 is provided with a central opening 20, directly over the front faces of the two central plates 16 of the chains 14 and 15, so as to expose to view the two characters thereon. Thus it will be seen that when the registering device is in the position shown, it will indicate "08."

Extending through the registering device 11 are two operating arms 21 and 22, which are pivotally connected to the frame 13 as at 23 and 24 respectively, and the ends of which extend beyond the casing 19. These arms 21 and 22 are adapted to be separately raised and lowered, the raising of the arm 21 effecting the forward registering movement of the device 11, and the raising of the arm 22 effecting the reverse registering movement of the device 11, as I shall now proceed to explain.

The inner faces of the links of the chain 14 are each provided with two notches 25 and 26, and the inner faces of the links of the chain 15 are each provided with two notches 27 and 28. One of the series of notches 28 is made deeper than the remaining number, and is indicated at 28$^a$, for a purpose hereinafter explained, and one of the series of notches 27 is made deeper than the remaining number, and is indicated at 27$^a$, for a purpose hereinafter explained.

Within the chain 15 are arranged two pawls 29 and 30 which are adapted to engage the notches 27 and 28 respectively of the chain 15, and within the chain 14 are arranged two pawls 31 and 32 which are adapted to engage the notches 25 and 26 respectively of the chain 14. The pawls 29 and 31 are connected together and operate as a unit and are pivotally connected as at 33 to a slide plate 34; and the pawls 30 and 32 are connected together and operate as a unit, and are pivotally connected as at 35 to a slide plate 36.

The slide plate 34 is provided with perforated ears 37 and 38, which are fitted to vertical guide rods 39 and 40 respectively on the frame 13; and the slide plate 36 is provided with perforated ears 41 and 42 which are fitted to vertical guide rods 43 and 44 respectively on the frame 13. Thus the slide plates are vertically movable upon their guide rods. The slide plate 34 is held normally depressed by the action of a spring 45 encircling the rod 40, and acting upon the ear 38; and the slide plate 36 is held normally depressed by the action of a spring 46 encircling the rod 44 and acting upon the ear 42.

The pawls 29 and 31 are pressed toward the chains 15 and 14 respectively by a spring 51 encircling their pivot pin 33, and when the plate 34 carrying the pawls 29 and 31 is in its depressed position, the pawls are held from engagement with the chains by a pin 52 on the pawl 29 engaging a cam plate 53 on the frame 13. The pawls 30 and 32 are pressed toward the chains 15 and 14 respectively, by a spring 54 encircling their pivot pin 35, and when the plate 36 carrying the pawls 30 and 32 is in its depressed position, the pawls are held from engagement with the chains by a pin 55 on the pawl 32 engaging a cam 56 on the frame 13.

The slide plate 34 is raised and lowered as will be hereinafter explained, to effect the forward movement of the registering device 11. During the initial upward movement of the slide plate 34, the pin 52 will ride down the incline of the cam plate 53 and permit the spring 51 to move the pawls 29 and 31 toward the chains 15 and 14, and when the plate 34 is depressed to normal position, the cam plate 53 engaging the pin 52 will move the pawls 29 and 31 from engagement with the chains.

The slide plate 36 is raised and lowered as will be hereinafter explained, to effect the reverse movement of the registering device 11. During the initial upward movement of the slide plate 36, the pin 55 will ride down the incline of the cam plate 56 and permit the spring 54 to move the pawls 30 and 32 toward the chains 15 and 14, and when the plate 36 is depressed to normal position, the cam plate 56 engaging the pin 55 will move the pawls 30 and 32 from engagement with the chains.

Each time the slide plate 34 is raised and lowered, the pawl 29 moves into engagement with one of the notches 28 and advances the chain 15 the distance of one plate or link 16; but the pawl 31 is not permitted to move into engagement with the notches 26 of the chain 14 until the pawl 29 engages the deep notch 28$^a$, which is deep enough to permit a movement of the pawl 29 sufficient to move the pawl 31 into engagement with one of the notches 26. Therefore, each time the chain 15 has been moved a complete revolution by the pawl 29, the pawl 31 will be permitted to engage a notch 26 of the chain 14, and move the chain 14 the distance of one of its links or plates. Thus, after the characters "1" to "9" of the chain 15 have been successively brought into view by the operation of the pawl 29, the next operation of the pawl 29 will permit the pawl 31 to engage a notch 26 of the chain 14 and move the chain 14 the distance of one of its notches or plates, and bring into view the next succeeding character ("1", for example) on the chain 14. It will thus be seen that, starting with the character "1" of the chain 15 in view, and the character "0" of the chain 14 in view, as shown, after the first complete revolution of the chain 15, the registering device 11 will show "10" within the opening 20; and after the completion of the second revolution of the chain 15, the device 11 will show "20" within the opening 20, and so on.

Each time the slide plate 36 is raised and lowered, the pawl 30 moves into engagement with one of the notches 27, and effects a reverse movement of the chain 15 the distance of one plate or link 16; but the pawl 32 is not permitted to move into engagement with the notches 25 of the chain 14 until the pawl 30 engages the deep notch 27$^a$ which is deep enough to permit a movement of the pawl 30 sufficient to move the pawl 32 into engagement with one of the notches 25. Therefore, each time the chain 15 has been moved a complete revolution by the pawl 30, the pawl 32 will be permitted to engage a notch 25 of the chain 14, and effect a reverse movement of the chain 14, the distance of one of its links or plates. Thus, after the characters "1" to "9" of the chain 15 have been successively brought into view in reverse order by the operation of the pawl 30, the next operation of the pawl 30 will permit the pawl 32 to engage a notch 25 of the chain 14 and effect a reverse movement of the chain 14 the distance of one of its links or plates, and bring into view the next succeeding character on the chain 14. It will thus be seen that, starting with the character "0" of the chain 15 in view, and the character "2" of the chain 14 in view, after the first complete reverse revolution of the chain 15, the registering device 11 will show "10" within the opening 20, and after the completion of the second reverse revolution of the chain 15, the device 11 will show "00" within the opening 20, thus indicating that all the fares have been checked off.

In order to lock the chains 14 and 15 in the different positions to which they are moved during the registering operation, I provide a pair of flat springs 60 and 61, the lower ends of which are secured to the tracks 18 of the frame 13, and the upper ends of which are connected by a bar 62 and are free to move toward and from the chains 14 and 15. The upper ends of the springs 60 and 61 are provided with notches 63 which are adapted to engage the pivot pins 17 of the links of the chains 14 and 15, and lock them in their positions of adjustment. The normal position of the notched ends of the springs 60 and 61 is in engagement with the pins 17 when the chains 14 and 15 are at rest, and prior to the movement of each chain 14 and 15 the bar 62 is operated to move the free ends of the spring 60 and 61 to disengage their notches 63 from the pins 17. This is effected by the outward rocking of a shaft 64 which is provided with an arm 65 adapted to engage the bar 62.

The shaft 64 is provided with two arms 66 and 67. The arm 66 is adapted to be engaged by the beveled end of an arm 68, carried by the slide plate 34, which arm 68 operates the arm 66 in a manner to rock the shaft 64 and unlock the chains 14 and 15 to permit the slide plate 34 to effect the forward registering movement of the device.

The arm 67 is adapted to be engaged by one end of a pin 69 which is mounted to slide in brackets on the frame 13. The other end of the pin 69 is adapted to be engaged by the beveled end of an arm 70 carried by the slide plate 36, which arm 70 operates the pin 69 in a manner to cause it to engage the arm 67 and rock the shaft 64 and unlock the chains 14 and 15 to permit the slide plate 36 to effect a reverse registering movement of the device.

The slide plate 34 is provided with a pin 47 which projects into a slot 48 in the arm 21 hereinbefore mentioned, whereby, when the arm 21 is raised, the slide plate 34 will be raised thereby against the action of the spring 45 to effect the forward registering movement of the device. The slide plate 36 is provided with a pin 49 which projects into a slot 50 in the arm 22 hereinbefore mentioned, whereby, when the arm 22 is raised, the slide plate 36 will be raised thereby against the action of the spring 46 to effect the reverse registering movement of the device.

Thus it will be seen, from the foregoing description, that each time the arm 21 is raised a forward registering movement of the device will be effected to register a passenger boarding the car; and that each time the arm 22 is raised a reverse registering movement of the device will be effected, to check off a fare that has been collected.

I shall now describe the means for operating the two registering devices 10 and 11. Extending longitudinally through the car body above the registering device 11, is a shaft 71, which is provided with two arms 75 and 76, the arm 75 being connected by a flexible strap or chain 77 to the arm 21, and the arm 76 being connected by a flexible strap 78 to the arm 22. Thus it will be seen that when the shaft 71 is rocked in the direction of the full line arrow in Fig. 1, the arm 21 will be raised to effect a forward registering movement of the device 11, and that when the shaft is rocked in the direction indicated by the dotted line arrow in Fig. 1, the arm 22 will be raised to effect a reverse registering movement of the device 11. The ends of the shaft 71 are provided with arms 72, which are connected to cords or straps 73 extending around suitable pulleys 74 to positions adjacent the positions occupied by the motorman on each platform 6 of the car, so that as a passenger enters the car at the end occupied by the motorman, the motorman may draw upon the cord 73 which will turn the shaft 71 in the direction indicated by the full line arrow in Fig. 1, and effect a forward registering movement of the device 11. Throughout the length of the car the shaft 71 is provided with suitable arms 79 by means of which the conductor may rock the shaft 71 in the direction indicated by the dotted line arrow in Fig. 2 each time he collects a fare. The rocking of the shaft 71 in this direction raises the arm 22 to effect a reverse registering movement of the device 11 and the checking off of the fare collected. The shaft 71 is provided with an upwardly extending arm 80 which is connected by a flexible strap 81 with the operating arm 12 of the registering device 10, whereby, each time the conductor turns the shaft 71 in the direction of the dotted line arrow to effect a reverse registering movement of the device 11 each time a fare is collected, the arm 80 will, through the strap 81, operate the arm 12 to register the collected fare upon the device 10.

In the employment of the invention hereinbefore described, it will be seen that in operating passenger cars, if the passengers are compelled to enter the car at end occupied by the motorman, the motorman may, by operating the strap 73, register upon the device 11 each passenger as he boards the car, and that each time a fare has been collected from a passenger the conductor may operate the shaft 71 to check off the collected fare from the device 11 and to register the collected fare upon the device 10. Thus the conductor will at all times know whether or not there is a passenger or passengers aboard the car from whom he has not collected a fare or fares.

I claim:—

1. The combination of a car, a registering device having a forward and a reverse registering movement, means for effecting the forward registering movement of said device, means for effecting the reverse registering movement of said device, and a second registering device having an operating part connected to the second named means.

2. The combination of a car, a registering device having a forward and a reverse registering movement, a register operating shaft extending through the car, means for effecting the forward registering movement of said device, means connected to said shaft for effecting the reverse registering movement of said device, and a second registering device having an operating part connected to the second named means.

3. The combination of a car, a registering device having a forward and a reverse registering movement, a register operating shaft extending through the car, means connected to said shaft for effecting the forward registering movement of said device, means connected to said shaft for effecting the reverse registering movement of said device, and a second registering device having an operating part connected to the second named means.

4. The combination of a car, a registering device located within the car and having a forward and a reverse registering movement, means extending to a platform outside of the car body for effecting the forward registering movement of said device, and means within the car for effecting the reverse registering movement of said device.

5. In a registering device the combination of a movable registering member having pawl engaging parts, a pair of reciprocative operating parts, a pawl carried by one of said parts for moving said member forwardly, a pawl carried by the other of said parts for moving said member in a reverse direction, an operating arm for one of said parts, and an operating arm for the other of said parts.

6. In a registering device the combination of a movable registering member having pawl engaging parts, a pair of reciprocative operating parts, a pawl carried by one of said parts for moving said member forwardly, a pawl carried by the other of said parts for moving said member in a reverse direction, an operating arm for one of said parts, an operating arm for the other of said parts, and means for holding said member in positions of adjustment.

7. In a registering device the combination of a movable registering member, a pair of reciprocative plates, a pawl carried by one of said plates for engaging said member and moving it forwardly, a pawl carried by the other of said plates for engaging said member and moving it in a reverse direction, an operating arm connected to one of said plates, and an operating arm connected to the other of said plates.

8. In a registering device, the combination of a registering member comprising an endless chain of links having pawl engaging parts, means including a pawl arranged within said chain and positioned to engage one side thereof for moving said member forwardly, and means including a pawl arranged within said chain and positioned to engage the other side of said chain for moving said member in a reverse direction.

9. In a registering device, the combination of a registering member comprising an endless chain of links having pawl engaging parts, means including a pawl arranged within said chain and positioned to engage one side thereof for moving said member forwardly, means including a pawl arranged within said chain and positioned to engage the other side of said chain for moving said member in a reverse direction, and means for holding said member in positions of adjustment.

10. In a registering device the combination of a registering member comprising an endless chain of links, a pair of operating arms extending through said chain, means operated by one of said arms for engaging one side of said chain to move it forwardly, and means operated by the other of said arms for engaging the other side of said chain and moving it in a reverse direction.

In testimony whereof, I have hereunto affixed my signature.

JOHN H. HOOD.

Witnesses:
 A. V. GROUPE,
 E. M. WARE.